July 6, 1965  C. A. MENELEY ETAL  3,193,822
PILOTLESS AIRCRAFT NAVIGATIONAL SYSTEM
Filed Dec. 18, 1948  3 Sheets-Sheet 1

INVENTORS
Carl A. Meneley &
Richard E. Langworthy
BY
ATTORNEY

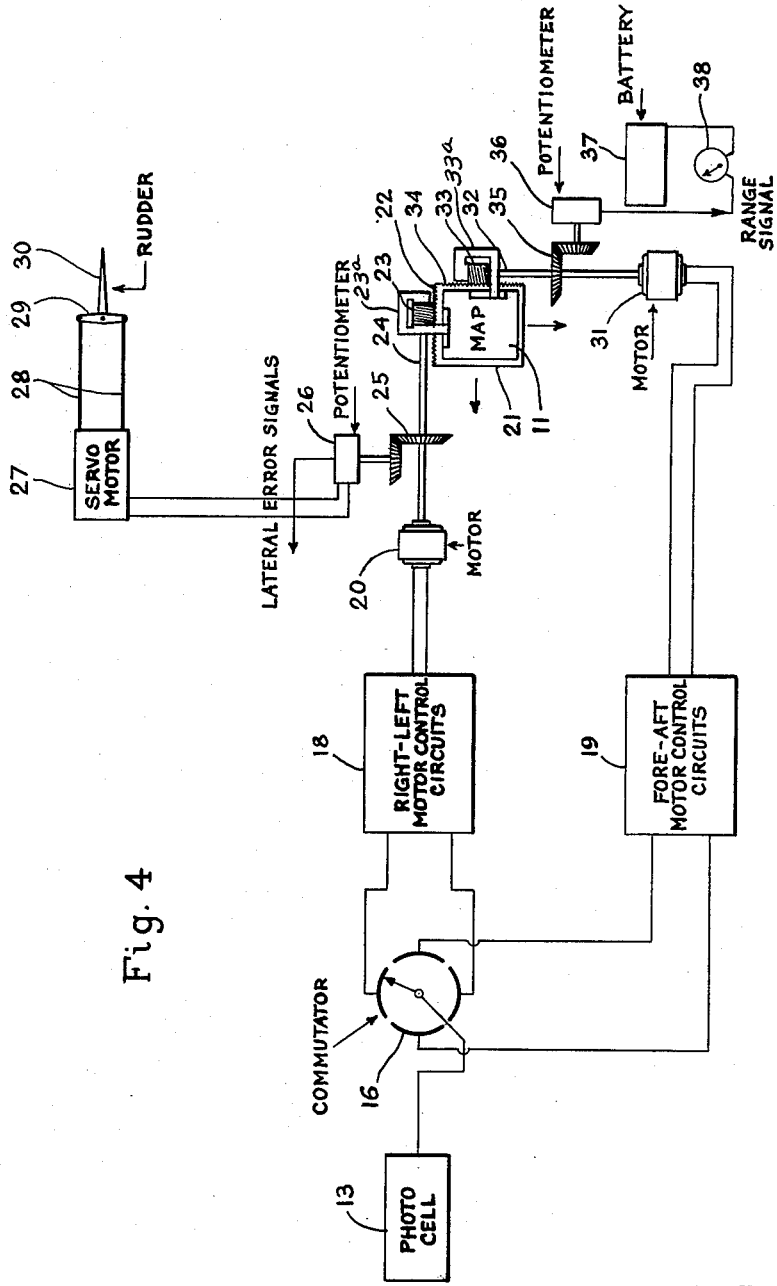

United States Patent Office 3,193,822
Patented July 6, 1965

3,193,822
PILOTLESS AIRCRAFT NAVIGATIONAL SYSTEM
Carl A. Meneley and Richard E. Langworthy, Cuyahoga Falls, Ohio, assignors to Goodyear Aerospace Corporation, a corporation of Delaware
Filed Dec. 18, 1948, Ser. No. 66,048
10 Claims. (Cl. 343—7)

This invention relates to guiding pilotless aircraft and the like, and is more particularly concerned with apparatus associated with the aircraft which will compare information obtained during flight with stored reference information concerning its course and position, with automatic means for correcting the course of the aircraft in response to the comparison of information.

In manned aircraft, navigation has been accomplished visually by comparing terrain features with the features shown on a map of the area. Under conditions of poor visibility, the same has been accomplished by comparing the image shown on a radar plan position indicator (P.P.I.) with a photograph, radar photograph, or map of the area. In any of these methods, determination of the aircraft's position is essentially a process of comparing two maps mentally, and the comparison is one in which consideration is given to a large number of terrain features, such as the size, shapes, and positions of rivers, lakes, coastlines, roads, mountains, built-up areas, etc.

It has been proposed heretofore in the patent application of James Byron Jones, Serial No. 790,151, filed December 6, 1947, to provide guidance for a pilotless aircraft or the like by the automatic comparison, without human intelligence, of terrain information with stored reference information, and from the results of this comparison to generate automatically lateral and longitudinal error data with respect to a planned flight path, together with means for automatically employing the error data to correct the course of the aircraft. The present invention is concerned with simplified and improved apparatus over that disclosed and claimed in the aforesaid application of James Byron Jones.

It is the general object of the invention to provide improved relatively light weight, inexpensive, fast working and substantially fool-proof apparatus for automatically guiding a pilotless aircraft or the like in flight by comparison of a substantially instantaneous image obtained in flight of the terrain over which the aircraft is passing with stored reference information in the form of an opposite contrast map having substantially the same scale and orientation as the image.

Another object of the invention is the provision of apparatus of the type described wherein mirror and lens means are utilized to effect a superimposing of the map and image and for effecting relative matching movement therebetween.

Another object of the invention is to provide in apparatus of the type described commutator means in association with the means for effecting relative movement between the map and image, together with light responsive means to indicate a match of the map and image, the light responsive means controlling through the commutator means mechanism for repositioning the map and image and for simultaneously effecting guidance correction on the aircraft in response to the amount of repositioning movement required.

The foregoing objects of the invention, and other objects which will become apparent as the description proceeds, are achieved by providing in combination means, such as a radar screen, for producing a substantially instantaneous image of the terrain over which the aircraft is flying, means for directing the image against a mirror, an opposite contrast map of the terrain over which the aircraft is flying and to the same scale and orientation and positioned so that the image is reflected by the mirror against the map, a photocell positioned behind the map, lens means between the photocell and map for focusing any light passing through the map against the cell, motor means for rotating the mirror, the mirror being mounted at a slight angle to cause the image to scan a small circle on the map as the mirror is rotated, commutator means having at least two segments associated with the mirror and controlling the flow of electric current from the photocell, motor and drive means operated from opposed segments of the commutator and adapted to move the map in a fore or aft direction, motor and drive means operated from the two other opposed segments of the commutator and adapted to move the map in a right or left direction, means controlled by the last named means to move the rudder of the aircraft right or left, and means controlled by the means moving the map fore and aft to give an indication of range.

For a better understanding of the invention, reference should be had to the accompanying drawing, wherein:

FIG. 4 is a diagrammatic illustration of the apparatus of the invention which utilizes the matching of the map and the substantially instantaneous image to effect correction in guidance and control of the aircraft.

It will be understood that the present invention provides apparatus for scanning one map or image over a portion of another and the development of lateral and longitudinal error signals, and provides apparatus for using these error signals for aligning the two maps and providing guidance for the aircraft along a planned flight path.

Figure 1:
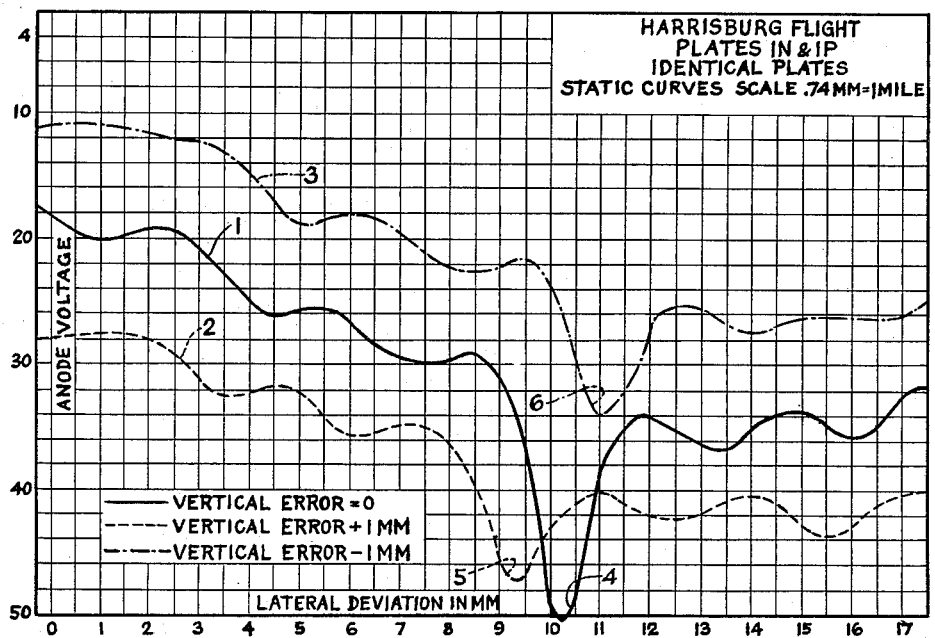
FIG. 1 is a graphical representation in curve form of light transmission versus horizontal or vertical displacement of super-imposed, positive and negative transparencies in the form of radar pictures.

Having more particular reference to the drawings, and specifically to FIG. 1, two radar photographs of the mountainous area near Harrisburg, Pa., were made, one being a positive transparency, the other a negative transparency, both maps being made to the scale .74 mm. equals one mile. These maps were superimposed and the total light transmission was measured, the light transmission being indicated in terms of anode voltage of a photoelectric cell which was plotted against lateral deviation in millimeters between the superimposed maps. Three conditions are illustrated in the graph, namely, where the vertical error between the maps was zero, where the vertical error between the maps was plus one millimeter, and where the vertical error between the maps was minus one millimeter. The numerals 1, 2 and 3 indicate respectively the curves drawn from the data collected in the three cases mentioned.

It will be noted from the curves that the reduction of light transmission at the matched points, indicated by the numerals 4, 5 and 6 respectively, is quite substantial when compared to the spurious dips which occur at positions of mis-match. It has been found from an examination of a number of radar maps that the width of the dip around the match point is of the order of 10% of the diameter of the map.

Figure 3:
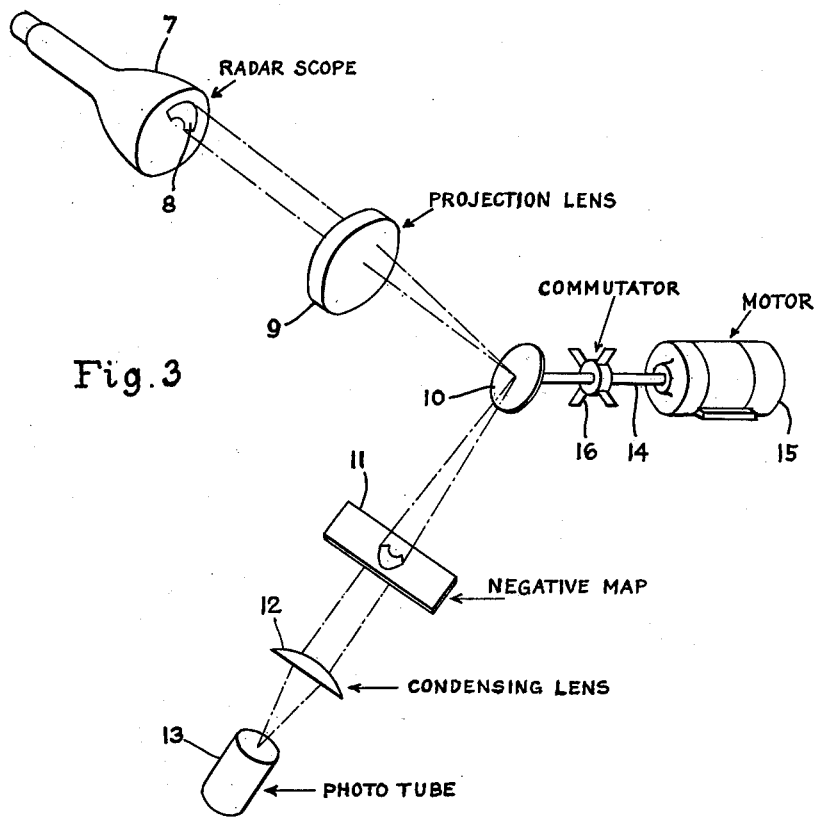
FIG. 3 is a diagrammatic perspective view of the mechanical-optical apparatus incorporated in the invention.

Apparatus for using the type of information obtained from FIG. 1 is illustrated in FIG. 3, wherein the numeral 7 indicates a plan position indicator (P.P.I.) tube for producing a substantially instantaneous image of the terrain over which the pilotless aircraft is flying. The image 8 produced on the tube 7 is directed by a lens 9 against a mirror 10 from which it is reflected to an opposite contrast map 11 having substantially the same scale and orientation as the image 8. By opposite contrast is meant if the image 8 is positive, then the map 11 is negative, or vice-versa. The map 11 may be made from actual radar photographs obtained by flying a similar radar over the area before the pilotless aircraft flight, or may be made by other methods, such as the utilization of an ultra-sonic radar trainer operating over a built-up model of the terrain over which the aircraft is to fly. The map 11 covers a larger area than that presented by the image 8.

The light which passes through the map 11 is collected by a condensing lens system 12 and directed into a photocell 13. It will be understood that suitable amplifier means are usually incorporated with the photocell 13.

The mirror 10 is adapted to be moved in such a manner that the image 8 reflected from it onto the map 11 will have a movement relative to the map to effect a scanning and a matching action of the image and map. This is achieved in the embodiment of the invention illustrated by mounting the mirror 10 at a slight angle on the end of a shaft 14 driven by a motor 15. Thus, rotation of the mirror causes the image 8 on the P.P.I. screen to scan a small circle on the map 11.

Figure 2:
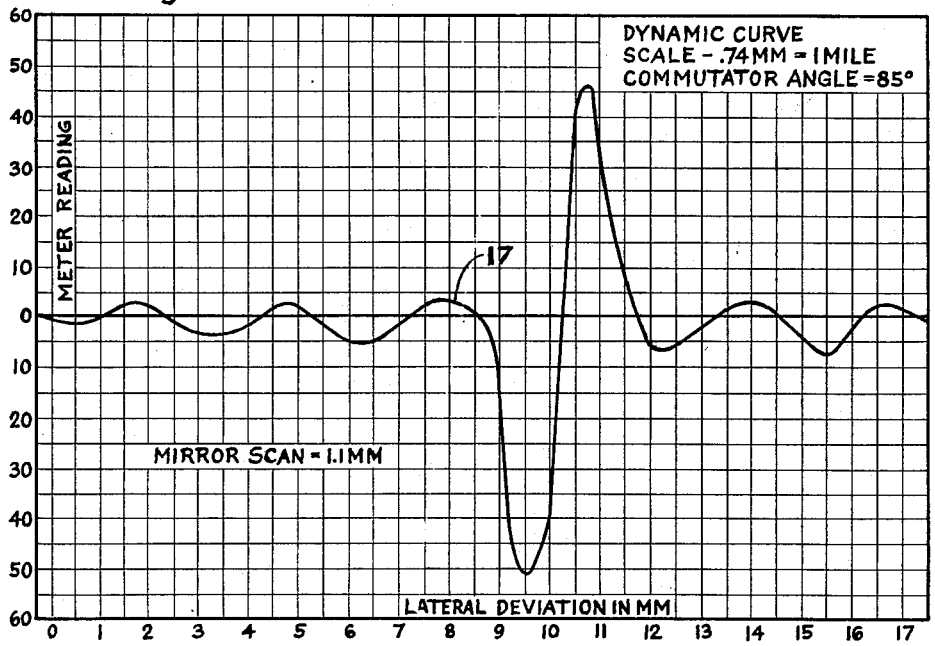
FIG. 2 is a curve which is the derivative of the curve of FIG. 1, and which plots amplitude versus displacement of the compared maps as obtained by the apparatus of the invention.

Associated with the motor shaft 14 is a commutator 16 which is adapted to be connected to the photo tube 13 and with suitable control circuits in the manner illustrated in FIG. 4. The output of the commutator and photocell when plotted to illustrate amplitude versus displacement results in the curve 17 illustrated in FIG. 2, this curve being the derivative of the curve of FIG. 1.

The commutator 16 preferably has four segments, two opposed segments being connected to a right-left motor control circuit box 18, and the remaining two opposed segments being connected to a fore-aft motor control circuit box 19.

It will be understood that the output of the photocell 13 is suitably amplified, usually by means contained within the block marked "Photocell" in FIG. 4, and that the amplified output is commutated synchronously with the mirror scan into fore-aft and right-left components. The right-left components operate through amplifier and relay mechanism in the circuit box 18 to turn a motor 20 or other servo-mechanism in one direction or the other.

The motor 20 is associated with suitable mechanism for moving the map 11 in a right or left direction the proper amount necessary to keep the map lined up or matched laterally with the radar image. One such mechanism to achieve this purpose is diagrammatically shown in FIG. 4 as comprising a frame 21 for the map 11 which frame is formed with a worm rack 22 along one edge with which engages a worm 23 mounted on a shaft 24 connected to the motor 20.

The amount of motion of the map 11 in a right or left direction is a measure of the amount of lateral deviation from the planned flight path and is used to control a pilotless aircraft so as to cause it to return to the proper course. This is achieved in the form of the invention illustrated in FIG. 4 by utilizing bevel or other gearing 25 to connect the shaft 24 to a potentiometer 26 which in turn controls the operation of a servo-motor 27 having rods 28 pivotally connected to opposite ends of a crossbar 29 secured to the rudder 30 of the aircraft.

The circuit box 19 functions in a similar manner to control fore and aft components, and usually includes amplifier and relay means for operating a motor 31 or other servo-mechanism, the motor being connected to a shaft 32 carrying a worm 33 which engages with a worm rack 34 secured to the other edge of the map frame 21. Gearing 35 connects the shaft 32 with a potentiometer 36 which is connected to a battery 37 and to a meter switch or relay 38. In this manner, the motion of the map 11 in the fore and aft direction is a measure of range from a starting point which can be used to determine when the objective or target of the aircraft has been reached. The meter switch or relay 38 may be used to operate down elevators, effect bomb release or perform other functions dependent on range.

As heretofore noted, the apparatus showing of FIG. 4 is diagrammatic only and movement of the map frame 21 by the worm 23 obviously does not cause the frame to jamb or become disengaged with worm 33, and obviously movement of the map frame 21 by the worm 33 does not cause the frame to jamb or become disengaged with worm 23. One way to avoid jambing or disengagement, and various ways will be apparent to the skilled mechanic, is to make the shafts 24 and 32 flexible but relatively stiff and to hold the worms 23 and 33 in engagement with their respective racks with appropriate bearings. In FIG. 4 are shown suitable bearings 23a and 33a for this purpose which bearings rotatably engage their respective worms and slidably engage their respective racks. It will be understood that the actual movement of the map is relatively small, it normally being only fractions of an inch.

It will be understood that for the system to operate properly it is necessary that the image 8 and map 11 have substantially the same rotational orientation. This is accomplished by any known means, such as by stabilizing the radar image 8 by means of a flux-gate compass, or by the use of an automatic pilot.

From the foregoing, it will be recognized that the objects of the invention have been achieved by the provision of a completely automatic and self-contained guidance apparatus for use on pilotless aircraft, or the like. The terrain search equipment, for example, such as that terminating in the P.P.I. 7, provides increased target definition as the target is approached and thereby increases the inherent accuracy of the apparatus. Inasmuch as the apparatus is entirely self contained and requires no external control, it permits the utilization of a large number of pilotless aircraft simultaneously in the vicinity of the target. The apparatus uses a large area for comparison, and accordingly, resistance to jamming is provided inasmuch as only part of the area is likely to be jammed at a given time. The result is improved accuracy by utilizing the simultaneous comparison of a large number of terrain features.

While certain representative embodiments and details have been shown for the purpose of illustrating the invention, it will be apparent to those skilled in this art that various changes and modifications may be made therein without departing from the spirit or scope of the invention.

We claim:

1. A navigational system for a pilotless aircraft or the like including means for producing a substantially instantaneous positive image of the terrain over which the aircraft is flying, means for directing the image against a mirror, a negative map of the terrain over which the aircraft is flying and to the same scale and orientation and positioned so that the image is reflected by the mirror against the map, a photocell positioned behind the map, lens means between the photocell and map for focusing any light passing through the map into the cell, motor means for rotating the mirror, said mirror being mounted at a slight angle to cause the image to scan a small circle on the map as the mirror is rotated, commutator means having at least four segments associated with the mirror and controlling the flow of electric current from the photocell, motor and drive means operated from opposed segments of the commutator and adapted to move the map in a fore or aft direction, motor and drive means operated from the two other opposed segments of the commutator and adapted to move the map in right or left direction, means controlled by the last-named means to move the aircraft right or left, and means controlled by the means moving the map fore and aft to give an indication of range.

2. A navigational system for a pilotless aircraft or the like including means for producing a substantially instantaneous positive image of the terrain over which the aircraft is flying, means for directing the image against a mirror, a negative map of the terrain over which the aircraft is flying and to the same scale and orientation and positioned so that the image is reflected by the mirror against the map, a photocell positioned behind the map, lens means between the photocell and map for focusing any light passing through the map against the cell, motor means for rotating the mirror, said mirror being mounted at a slight angle to cause the image to scan a small circle on the map as the mirror is rotated, commutator means having at least four segments associated with the mirror and controlling the flow of electric current from the photocell, motor and drive means operated from opposed segments of the commutator and adapted to move the map in a right or left direction, and means controlled by the last-named means to move the aircraft right or left.

3. A navigational system for a pilotless aircraft or the like including means for producing a substantially instantaneous image of the terrain over which the aircraft is flying, means for directing the image against a mirror, an opposite contrast map of the terrain over which the aircraft is flying and to the same scale and orientation and positioned so that the image is reflected by the mirror against the map, a photocell positioned behind the map, lens means between the photocell and map for focusing any light passing through the map against the cell, means for moving the mirror to cause the reflection of the image to move over the surface of the map to effect a matching of the map and image, commutator means having at least two segments associated with the mirror and controlling the flow of electric current from the photocell, motor and drive means operated from opposed segments of the commutator and adapted to move the map in a right or left direction, and means controlled by the last-named means to move the aircraft right or left.

4. Apparatus for controlling flight of aircraft and the like including means for producing a substantially instantaneous image of the terrain over which the aircraft is moving, an opposite contrast previously prepared map of the terrain over which the aircraft is to fly, said map and image having the same scale and orientation, mirror and lens means for superimposing the map and image, means having associated commutator means for moving the mirror means to effect relative movement between the map and image to hunt a matching thereof, light responsive means for indicating a match between the map and image, and means controlled by the light responsive means and operating through the commutator means to bring the aircraft back on course.

5. Apparatus for controlling flight of aircraft and the like including means for producing a substantially instantaneous image of the terrain over which the aircraft is moving, an opposite contrast previously prepared map of the terrain over which the aircraft is to fly, said map and image having the same scale and orientation, mirror and lens means for superimposing the map and image, and means for moving the mirror means to effect relative movement between the map and image to hunt a matching thereof.

6. Apparatus for controlling flight of aircraft and the like including means for producing a substantially instantaneous image of the terrain over which the aircraft is moving, an opposite contrast previously prepared map of the terrain over which the aircraft is to fly, said map and image having the same scale and orientation, means for superimposing the map and image, means for moving the superimposing means to effect relative movement between the map and image to hunt a matching thereof, commutator means associated with the moving means, light responsive means for indicating a match between the map and image, and means controlled by the light responsive means and operating through the commutator means to bring the aircraft back on course.

7. Apparatus for controlling flight of aircraft and the like including means for producing a substantially instantaneous image of the terrain over which the aircraft is moving, an opposite contrast previously prepared map of the terrain over which the aircraft is to fly, said map and image having the same scale and orientation, means for superimposing the map and image, means for moving the superimposing means to effect relative movement between the map and image to hunt a matching thereof, commutator means associated with the moving means, means for indicating a match between the map and image, and means opearting through the commutator means to bring the aircraft back on course.

8. The combination in apparatus for guiding an aircraft and the like of a radar scope for at least periodically showing an image of the terrain over which the aircraft is moving, an opposite contrast map of the terrain over which the aircraft is to fly, said image and map being of substantially the same scale and orientation, mirror means for superimposing the image and map, and means for moving the mirror means to effect a matching of the image and map.

9. The combination in apparatus for guiding an aircraft and the like of a radar scope for showing an image of the terrain over which the aircraft is moving, an opposite contrast map of the terrain over which the aircraft is to fly, said image and map being of substantially the same scale and orientation, means superimposing and effecting relative movement between the image and map, means responsive to a match between the image and map and controlled by the distance of relative movement of the image and map in effecting a match to reposition the image and map with respect to each other, and means controlled by the repositioning to change the course of the aircraft.

10. The combination in apparatus for guiding aircraft and the like of a radar scope for showing an image of the terrain over which the aircraft is moving, an opposite contrast map of the terrain over which the aircraft is to fly, said image and map being of substantially the same scale and orientation, means superimposing and effecting relative movement between the image and map, and means responsive to a match between the image and map and controlled by the distance of relative movement of the image and map in effecting a match to reposition the image and map with respect to each other.

References Cited by the Examiner
UNITED STATES PATENTS

| | | | |
|---|---|---|---|
| 2,406,751 | 9/46 | Emerson | 35—1 |
| 2,428,427 | 10/47 | Loughren | 343—11 |
| 2,434,897 | 1/48 | Ayres | 343—11 |
| 2,444,933 | 7/48 | Jasperson | 318—489 |

MILTON BUCHLER, *Primary Examiner.*

MILTON L. MARLAND, *Examiner.*